(12) United States Patent
Diab et al.

(10) Patent No.: US 8,035,399 B2
(45) Date of Patent: *Oct. 11, 2011

(54) SYSTEM AND METHOD FOR USING A PHY TO LOCATE A THERMAL SIGNATURE IN A CABLE PLANT FOR DIAGNOSTIC, ENHANCED, AND HIGHER POWER APPLICATIONS

(75) Inventors: Wael William Diab, San Francisco, CA (US); Scott Powell, Carlsbad, CA (US); Minshine Shih, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/772,474

(22) Filed: May 3, 2010

(65) Prior Publication Data

US 2010/0214708 A1 Aug. 26, 2010

Related U.S. Application Data

(62) Division of application No. 11/761,419, filed on Jun. 12, 2007, now Pat. No. 7,737,704.

(51) Int. Cl.
*G01R 31/02* (2006.01)

(52) U.S. Cl. .................... 324/539
(58) Field of Classification Search .................... 324/539
See application file for complete search history.

(56) References Cited

U.S. PATENT DOCUMENTS

| 5,185,594 | A | 2/1993 | DeChurch |
| 5,412,374 | A | 5/1995 | Clinton |
| 6,980,007 | B1 | 12/2005 | Lo et al. |
| 7,358,745 | B1 | 4/2008 | Lo et al. |
| 7,404,091 | B1 * | 7/2008 | Gere ............................. 713/300 |
| 7,593,747 | B1 | 9/2009 | Karam et al. |
| 7,777,636 | B2 | 8/2010 | Diab et al. |
| 2004/0251912 | A1 * | 12/2004 | Pharn et al. .................... 324/534 |
| 2006/0115007 | A1 | 6/2006 | Karam et al. |
| 2007/0074052 | A1 | 3/2007 | Hemmah et al. |
| 2007/0283173 | A1 | 12/2007 | Webb et al. |

* cited by examiner

*Primary Examiner* — Amy He
(74) *Attorney, Agent, or Firm* — Duane S. Kobayashi

(57) ABSTRACT

A system and method for using a physical layer device to locate a thermal signature in a cable plant for diagnostic, enhanced, and higher power applications. Cable heating in specific sections of a network cable is detected through an automatic identification of a thermal signature in electrical measurements of a network cable. The correlation of the thermal signature to a specific section of the network cable enables network personnel to locate hot spots in the network cable with ease.

15 Claims, 6 Drawing Sheets

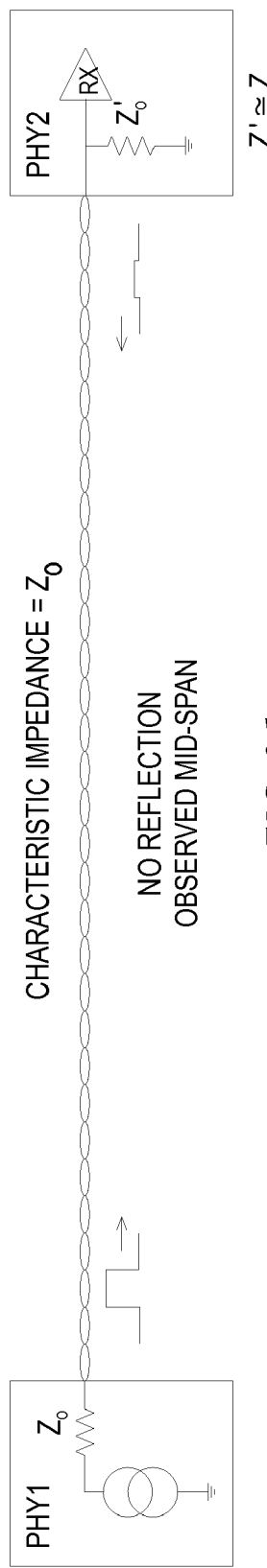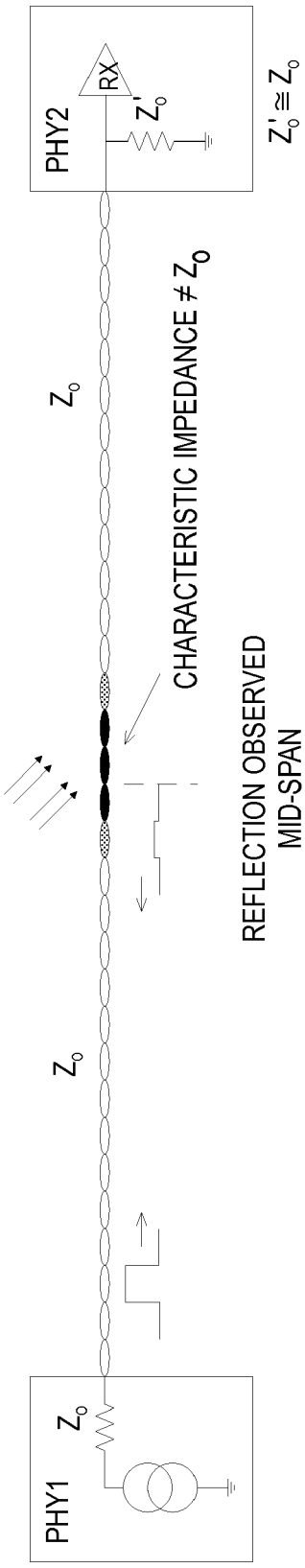
FIG. 3A
FIG. 3B

SYSTEM AND METHOD FOR USING A PHY TO LOCATE A THERMAL SIGNATURE IN A CABLE PLANT FOR DIAGNOSTIC, ENHANCED, AND HIGHER POWER APPLICATIONS

This application is a divisional of non-provisional application Ser. No. 11/761,419, filed Jun. 12, 2007, which is incorporated by reference herein, in its entirety, for all purposes.

BACKGROUND

1. Field of the Invention

The present invention relates generally to network cabling systems and methods and, more particularly, to a system and method for using a physical layer device (PHY) to locate a thermal signature in a cable plant for diagnostic and higher power applications.

2. Introduction

Heat can have a significant impact on the performance of a network cable. One problem that heat presents is the reduced cable operational parametrics for data transmission. In one example, heat can affect the insertion loss of the cable, thereby impacting data transmission on the cable. More generally, heat can affect the lifetime of the cable and its constituent materials and components.

While the general temperature of the entire cable can present an issue, the creation of a hot spot on a cable can also present significant issues. Hot spots on the cable can occur at localized points due to the constricted dissipation of heat caused by physical constraints such as conduits, poor air circulation, etc. Hot spots can be of concern because of the creation of dangerous heat conditions near other active equipment. Additionally, these hot spots can affect the data integrity in neighboring cables. As these examples illustrate, identifying the existence of hot spots in the network infrastructure can be of significant interest to IT personnel that are tasked with managing a data network infrastructure.

Additionally, hot spots are of significant interest to power over Ethernet (PoE) networks, which provide power to remote devices over network cables. The IEEE 802.3af and 802.3at PoE specifications provide a framework for delivery of power from power sourcing equipment (PSE) to a powered device (PD) over Ethernet cabling. In these applications, hot spots can produce reduced cable operational parametrics for power transmission. For example, heat will affect the resistance of the cable, which in turn will have an impact on the power transmission.

Locating hot spots in a network infrastructure is important for data and power transmission network operations. Conventional diagnostic techniques are typically focused on measuring the overall thermal condition of the entire length of cable. What is needed therefore is a mechanism that enables a diagnosis of the cabling infrastructure to identify the existence and location of hot spots in the network cables.

SUMMARY

A system and/or method for using a PHY to locate a thermal signature in a cable plant for diagnostic, enhanced, and higher power applications, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIGS. 3A and 3B illustrate an example of an effect of localized heating on cable measurements.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
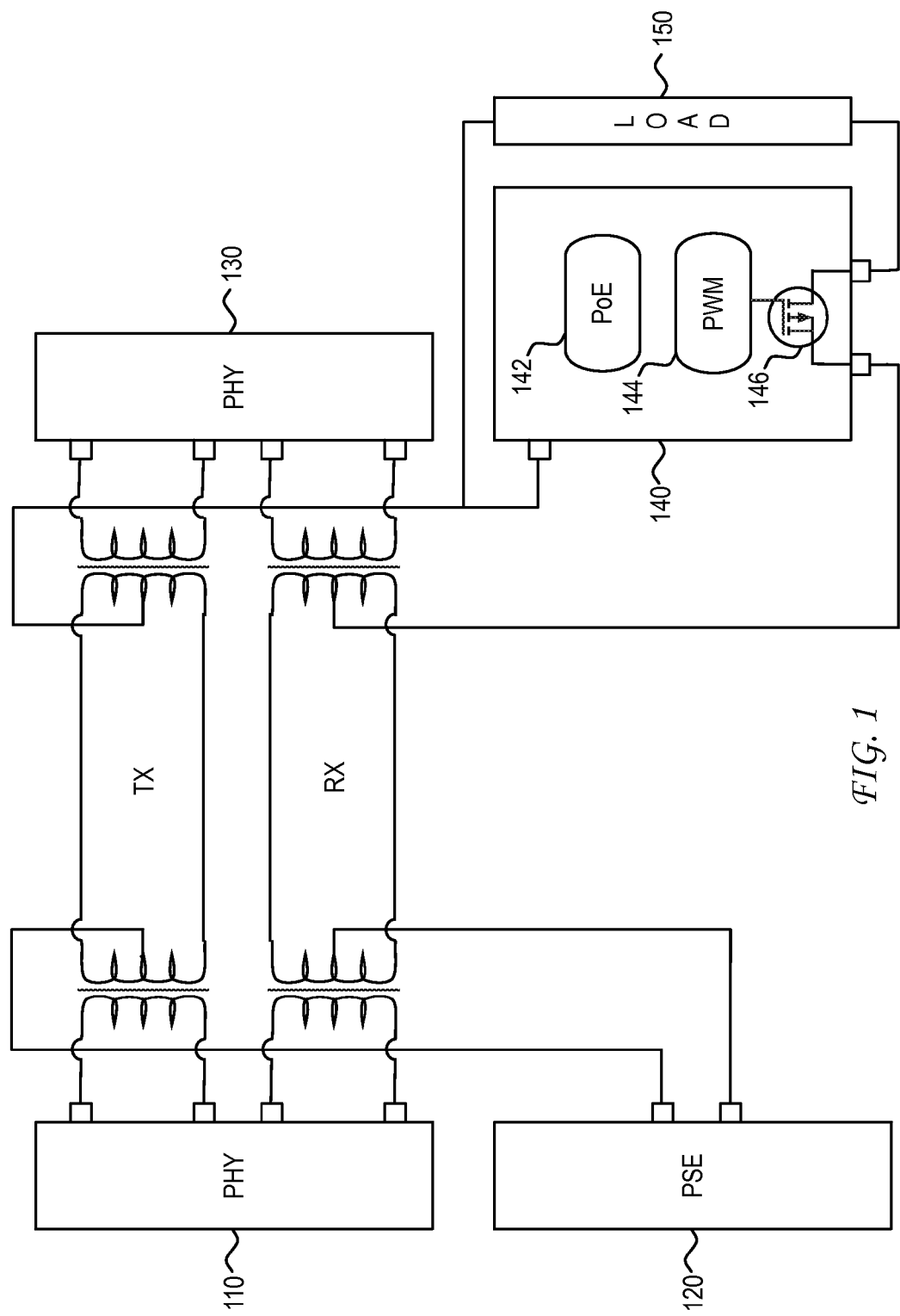
FIG. 1 illustrates an embodiment of a Power over Ethernet (PoE) system.

FIG. 1 illustrates an embodiment of a power over Ethernet (PoE) system. As illustrated, the PoE system includes power sourcing equipment (PSE) 120 that transmits power to powered device (PD) 140. Power delivered by the PSE to the PD is provided through the application of a voltage across the center taps of transformers that are coupled to a transmit (TX) pair and a receive (RX) pair of wires carried within an Ethernet cable. The two TX and RX pairs enable data communication between Ethernet PHYs 110 and 130.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3at, etc. PD 140 also includes pulse width modulation (PWM) DC:DC controller 144 that controls power FET 146, which in turn provides constant power to load 150. As would be appreciated, FET 146 could optionally be integrated with PWM controller 144.

In standard PoE system (e.g., IEEE 802.3af and legacy systems), each wire conductor has a specified current limit of 175 mA, resulting in a total specified current limit of 350 mA. In PoE+ system (e.g., IEEE 802.3at, its variations, and higher power proprietary schemes), higher per conductor current limits would be specified. The net effect of the passage of such levels of current through the wire conductor is the generation of heat. This heat can have a significant impact on the operation of the PoE system.

In higher power PoE+ applications, the first order constraint on how much current can be carried by the cabling system is the amount of heat the system experiences. This results because the heat has a direct effect on safety and the long-term life expectancy of the cable itself. Additionally, excess heat can also lead to the degradation of the data transmission capabilities of the cable. Because cabling systems are in very diverse environments, the heating effects can come from a variety of sources: heat generated within the cable itself, the environment temperature, the restriction in airflow in the environment (like conduits), neighboring cabling, etc.

As noted, the bundling of cables can create significant heat issues. For example, it is not uncommon to see massive bundles of cables (e.g., 90-150) leaving a data center or wiring closet. Moreover, conduits that may be within environmental constraints experience very limited airflow, thereby exacerbating the high temperature impact.

One of the concerns in PoE and PoE+ systems is the impact of having specific segments of the cable be exposed to higher temperatures than the remainder of the cable. For example, it is not uncommon to have a long cable routed through poorly cooled conduits in the building walls, run along an air conditioning system, or near the roof of a building in a hot external environment. Cable routings that experience one or more of these situations can lead to hot spots that are difficult to detect using discrete temperature readings taken at selected points of the cable. In general, these discrete temperature readings seek to discern the general temperature of the cable, not the existence of variations in the temperature of different segment of the cable.

It is therefore a feature of the present invention that a diagnosis tool is provided that can automatically locate temperature variances along a length of a cable. The location of these temperature variances would enable an IT professional to diagnose the cabling plant quickly to identify potentially hot sections of the cable. This automated diagnosis would save significant time and expense as compared to the manual inspection of a length of cable. Significantly, once a hot section of the cable is identified, the situation can be rectified, or the cable can be removed from use.

Figure 2:
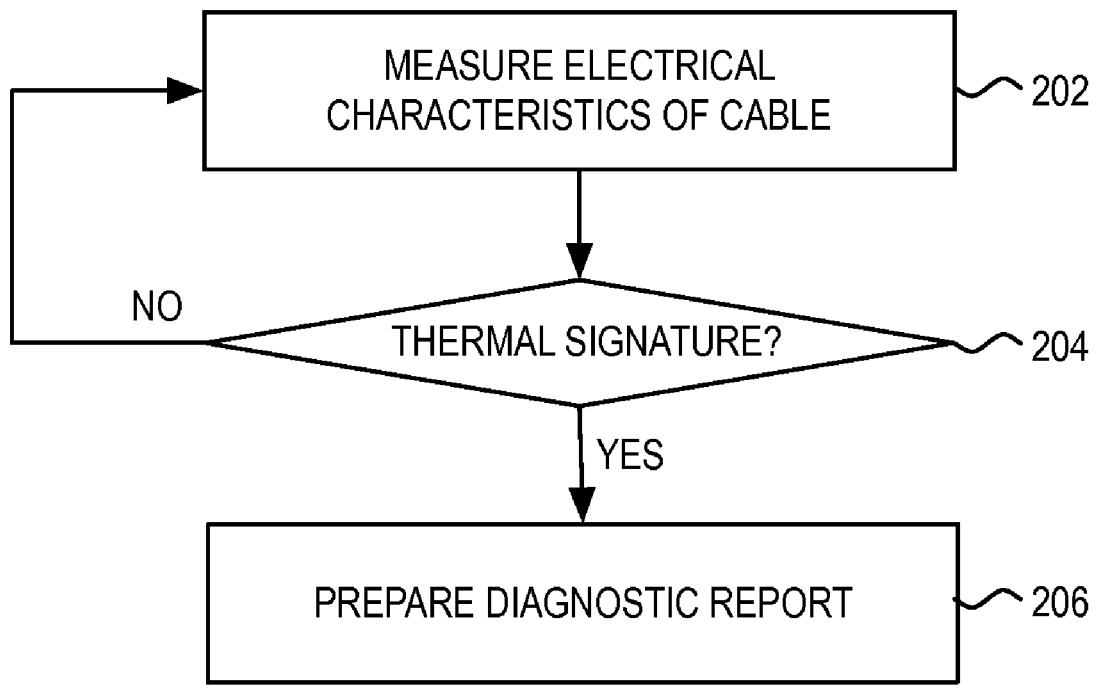
FIG. 2 illustrates a flowchart of a cable diagnostic process.

To illustrate the general process of the present invention, reference is made to the flowchart of FIG. 2. As illustrated, the diagnostic process begins at step 202, where one or more electrical characteristics of a cable are measured. At step 204, it is determined whether the measured electrical characteristics include a thermal signature indicative of a thermal discontinuity in a section of the cable. Here, the thermal signature would appear as an effect generated by a type of discontinuity in the cable due to the increased heat in that cable section. In a sense, the thermal signature would be similar to that produced by a discontinuity such as a connector, only the discontinuity would not be as abrupt but more evenly spaced out.

In one embodiment, the diagnostic process can use the electrical measurements attributable to different sections of the cable as a proxy for the variance in temperature between those different sections. For example, the electrical measurements at the end of the cable and at the section of interest can yield a variance in temperature between the end of the cable and the hotspot. In various embodiments, this process can be performed in correlation with a local temperature measurement at equipment such as that at an end of a cable, performed using a calibration mechanism, or performed based on a measured profile.

In one embodiment, the electrical measurements are passed to a CPU for a determination of the location of the hot spot via correlation of the electrical measurement to a length down the cable. In another embodiment, the electrical measurements are passed to the CPU for processing as a proxy for temperature measurements.

If it is determined at step 204 that a thermal signature has not been identified, then the process would end or would loop back to step 202 for further measurements. If, on the other hand, it is determined at step 204 that a thermal signature has been identified, then the process would proceed to step 206, where a diagnostic report would be prepared. In one example, the diagnostic report would indicate the particular section or point in a cable that contains the thermal discontinuity. IT professionals could then check the cable condition at that cable section or point to determine whether a thermal issues exists. This automated diagnostic tool would obviate the need for the IT professional to perform an end-to-end inspection of the cable.

In one embodiment, a PHY is configured to identify the hot spot using electrical measurements that span an entire length of a cable. One example of such an electrical measurement is a time domain reflectometry (TDR) measurement, which directly measures reflections. FIGS. 3A and 3B illustrate an example of the effect of a hot spot on an electrical measurement. As illustrated in FIG. 3B, a localized heating condition can produce a mid-span reflection that is measured by PHY1. The location or cable section of the hot spot is determined through the measured discontinuity. In another example, the location of the hot spot can be identified through the monitoring of the taps of an echo canceller. A PHY typically cancels echo along the entire length of the cable. As a result, echo cancellers can have taps that cover the entire length of the round-trip delay of the channel. These taps would enable the PHY to adapt to changes in the channel. Here, the PHY would analyze the echo taps to determine whether a temperature signature indicative of a hot spot is present. As the echo taps can be directly related to the distance along the cable, the exact section of the cable where the hot spot exists can be identified. Regardless of the mechanism for identifying the hot spot, the location information can be used by an IT technician to address the temperature issue quickly.

In one embodiment, the electrical measurements taken by the PHY for a first section of the cable can be compared to electrical measurements taken for other sections of the cable (e.g., adjacent sections) to identify a temperature discontinuity. In another embodiment, the electrical measurements taken by the PHY are compared to previous electrical measurements to track the change over time. In this relative analysis, the differential change in the electrical measurements can be correlated to the increased heat at a particular section of the cable.

As would be appreciated, the principles of the present invention are not dependent on the particular electrical measurement that is performed by the PHY. Any electrical measurement that changes based on a change in temperature, and that can be correlated to a section of the cable can be used.

For example, a PHY can use a crosstalk measurement to identify a temperature signature. As the temperature of the cable changes, the cross talk measurement also changes. Here, the cross talk response curve could change with temperature (e.g., changes in the magnitude of the response, shape of the curve envelope, etc.). Analyzing the response curve or monitoring the changes over time can then be correlated to a temperature change in a particular section of the cable. A disadvantage of using crosstalk measurements is that PHYs typically cancel crosstalk in the first 20-30 m of the cable. As such, full coverage of the entire length of cable by a PHY on one end may not be practical. In accordance with the present invention, the temperature signature analysis can be performed on either side or on both sides of the cable. Where the particular temperature signature analysis by a PHY may be distance limited, the temperature signature analysis can be performed on both ends of the cable to achieve a more complete diagnostic over the entire cable length.

Figure 4:
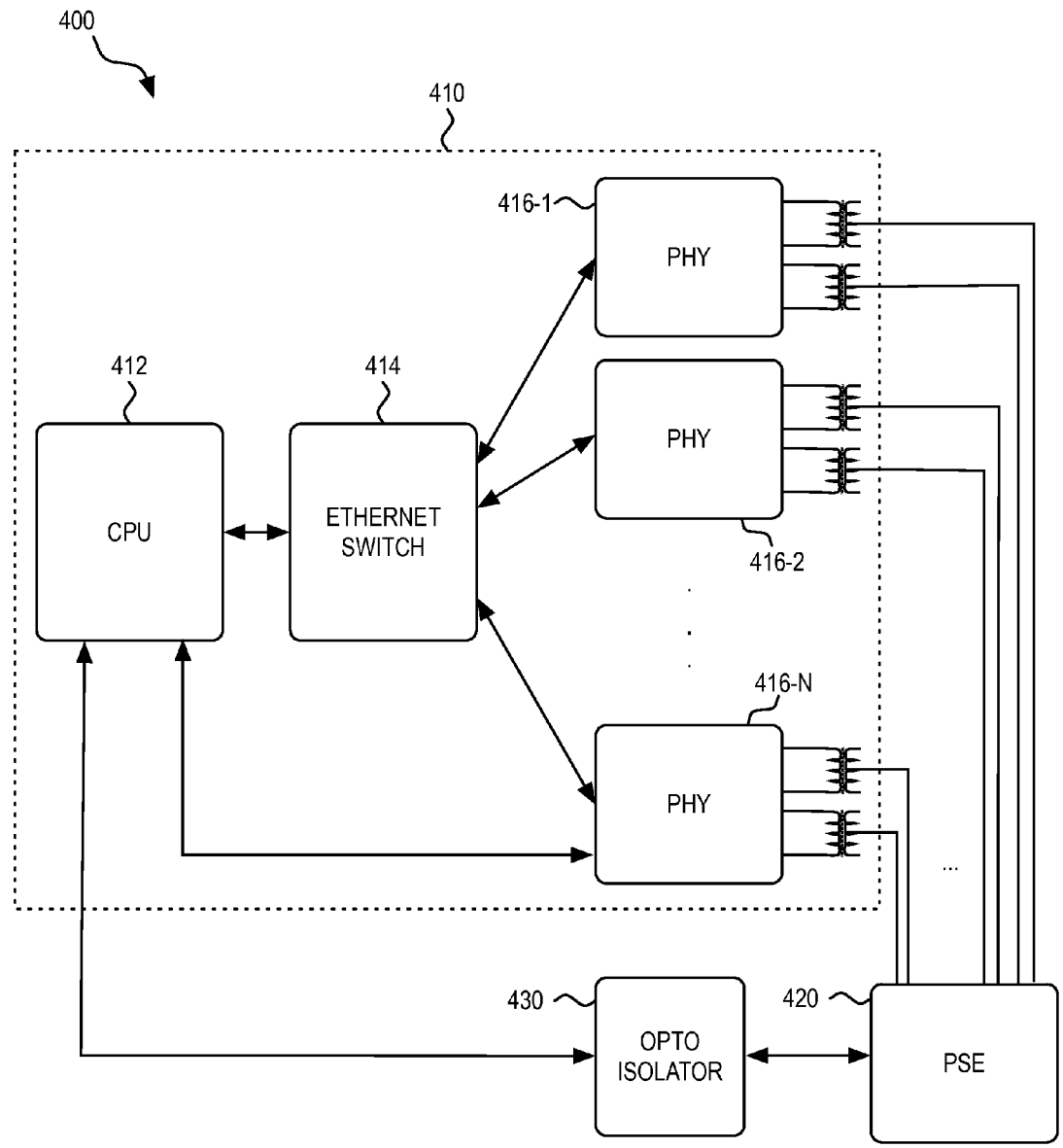
FIG. 4 illustrates an embodiment of a PoE environment at a PSE that enables a cable monitoring process.

FIG. 4 illustrates an embodiment of a PoE environment 400 at a PSE location in which the principles of the present invention can be implemented as part of a monitoring scheme. As illustrated, environment 400 includes PHYs 416-1 to 416-N that are each connected to Ethernet switch 414. While a PHY can include one or more Ethernet transceivers, the wiring for only a single transceiver is illustrated as being connected to PHY 416-N. As would be appreciated, a PHY can be discrete or integrated as part of Ethernet switch 414. Each PHY is also connected to CPU 412, although only a single connection from CPU 412 to PHY 416-N is shown for simplicity. In one embodiment, CPU 412 is incorporated along with Ethernet switch 414 and PHYs 416-1 to 416-N on a single chip 410. In another embodiment, Ethernet switch 414 and PHYs 416-1 to 416-N are incorporated on a single chip separate from CPU 412, wherein communication with CPU 412 is enabled via a serial interface. Also illustrated in PoE environment 400 is a PSE 420 that provides power through the center taps of the transformers shown. As illustrated, PSE 420 is also coupled to CPU 412 via opto-isolator 430 that facilitates an isolation boundary.

Figure 5:
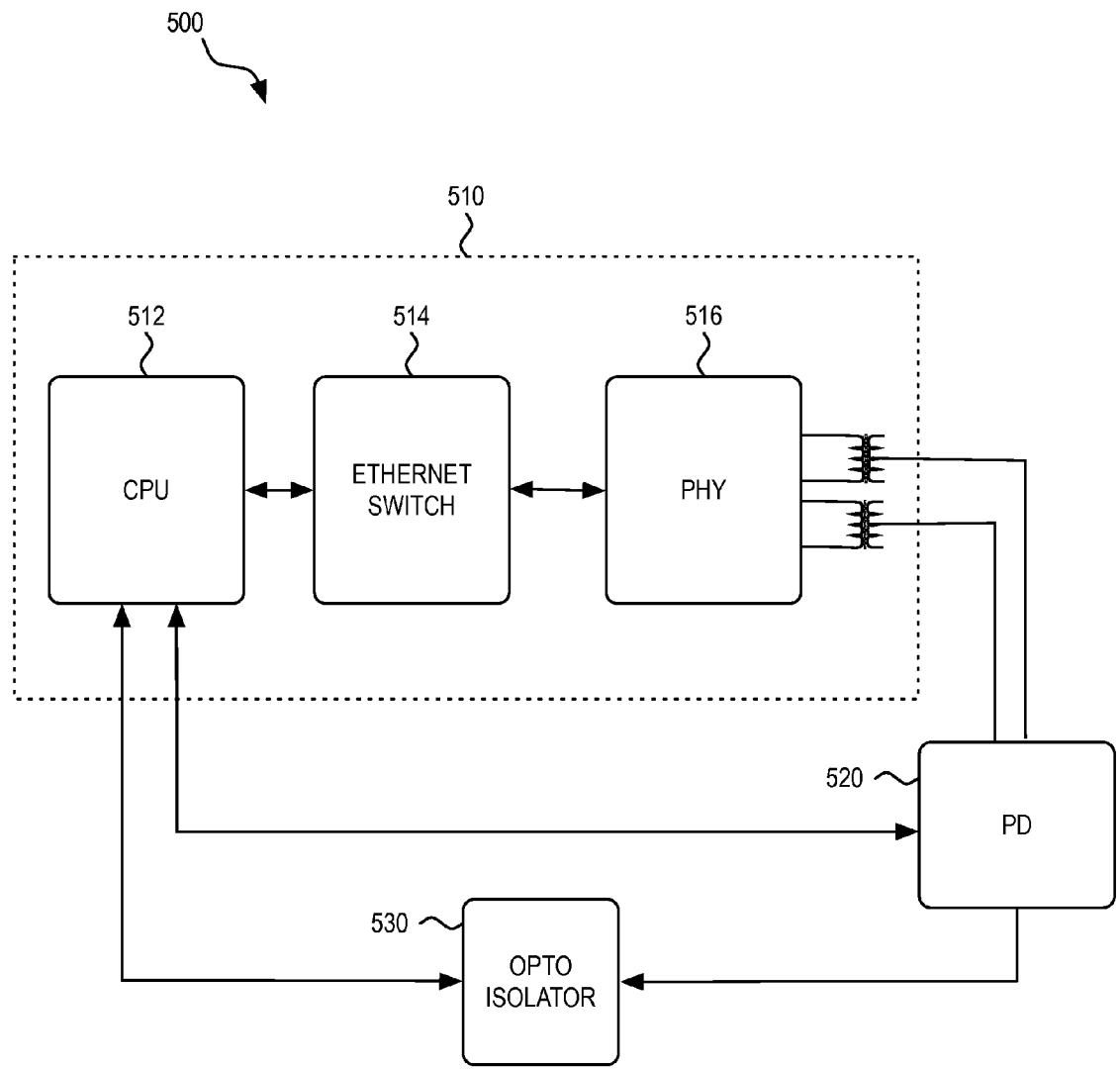
FIG. 5 illustrates an embodiment of a PoE environment at a PD that enables a cable monitoring process.

As noted, the electrical measurements could also be taken by the Ethernet transceiver at the PD location. FIG. 5 illustrates an embodiment of a PoE environment 500 at a PD location. As illustrated, environment 500 includes PHY 516 that is connected to Ethernet switch 514. As would be appreciated, the PHY at the PD can include one or more Ethernet transceivers. PHY 516 is also connected to CPU 512. In the illustrated embodiment, CPU 512 is incorporated along with Ethernet switch 514 and PHY 516 on a single chip 510. In another embodiment, Ethernet switch 514 and PHY 516 are incorporated on a single chip separate from CPU 512, wherein communication with CPU 412 is enabled via a serial interface. Also illustrated in PoE environment 500 is PD 520 that extracts power from the center taps of the transformers shown. As illustrated, PD 420 is also coupled to CPU 512 via opto-isolator 530 that facilitates an isolation boundary.

As noted, measurements can be taken at the PSE and/or at the PD. If both ends of the link have the measurement capability, then the measurement data or analysis results can be exchanged between the PSE and the PD as required. A benefit of a dual monitoring capability is the increased accuracy of using two sources of information and/or analysis. In various embodiments, communication between the PD and the PSE can occur via a Layer 1 scheme, such as voltage and/or current modulation, Layer 2 (packets), Layer 3 (packets) or any such combination. Packets may be a standard protocol such as Ethernet, LLDP, OAM, or a proprietary system over these protocols.

Figure 6:
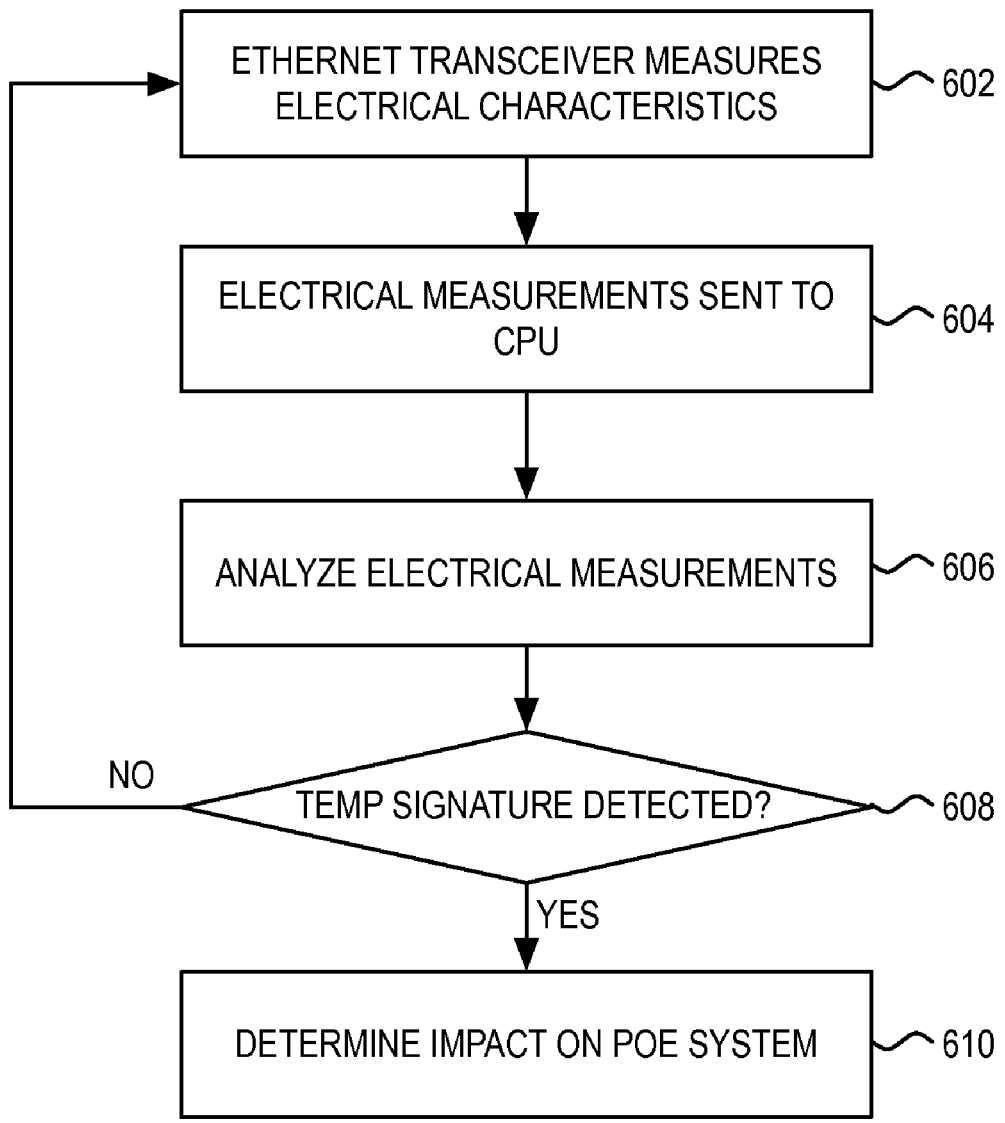
FIG. 6 illustrates a flowchart of a cable monitoring process.

To illustrate the operation of a PoE environment in implementing a monitoring scheme of the present invention, reference is now made to the flowchart of FIG. 6. As illustrated, the flowchart of FIG. 6 begins at step 602 where a transceiver in a PHY measures electrical characteristics of an Ethernet cable coupled to the PHY. In one embodiment, these electrical measurements are taken during an echo canceller convergence process performed by an echo canceller module under control of the CPU. Electrical measurements taken by the transceiver are then transmitted to the CPU at step 604. As noted, the measurements or results from a first end of a link can be transmitted remotely to the other end of the link. For example, the measurements taken at a PD can be transmitted to a PSE for analysis.

At step 606, the electrical measurements are then analyzed. In one embodiment, the electrical measurements can be analyzed either alone or in comparison with prior measurements. In another embodiment, the electrical measurements can be analyzed with reference to known measurements/temperatures and/or profiles.

Regardless of the particular methodology of analysis, at step 608, it is then determined whether a temperature signature has been detected. If no change is detected at step 608, then the process would loop back where further measurements are taken by the Ethernet transceiver. In this periodic monitoring process, the delay between measurements can be implementation dependent. For example, the delay between measurements can range from fractions of a second to tens of seconds or more. Here, the determined delay can be chosen to provide the system operator with any desired granularity of monitoring.

If a temperature signature is detected at step 608, then an impact on the PoE system configuration and/or operation is determined at step 610. In one embodiment, the PoE system can first change the allowable maximum power/current for that link. This maximum can be a new maximum that is determined independent of a power demand/budget, average cable temperature, cable capacity, etc. The new maximum can then be compared to the current power transmission as well as incoming requests. If the maximum is exceeded, then a change in the power applied by the PoE system over that cable is made with a notification to the entire system (PD and PSE). In general, the potential impact could consider a change in operation of a single PoE channel, or a group of PoE channels. As would be appreciated, the particular impact of an identified temperature signature on a cable can vary depending on the application.

One of the benefits of the present invention is that the temperature monitoring does not rely on probes at different points in the cable. Not only would the setting up of probes be impractical and not economically feasible, but the monitoring based on these probe measurements would also not be sufficient to guarantee that there isn't a problem on a particular section of the cable. For example, the cable may have a hot spot in a section of the cable that lies within a hot conduit.

Finally, it should be noted that the principles of the present invention can be applied to any form of network cabling, whether standard Ethernet cabling (e.g., Category 3, 5, 5e, 6, 7, etc.), non-standard cabling such as Type-II cabling, shielded, or unshielded cabling. Also, the principles of the present invention can be applied to PoE systems that use two pairs as well as four pairs. For four-pair systems, the individual pairs can be analyzed independently or as a system.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A power over Ethernet system for identifying a location of a temperature hot spot on an Ethernet cable, comprising:
   a powered device detection component that detects a presence of a powered device, said powered device coupled to a power sourcing equipment port via an Ethernet cable; and
   a power controller that controls power allocation to said power source equipment port based on electrical measurements of said Ethernet cable taken by a physical layer device, said electrical measurements being correlated to a temperature signature indicative of a temperature hot spot in a subsection of said Ethernet cable.

2. The power over Ethernet system of claim 1, wherein said electrical measurements are taken periodically by said physical layer device.

3. The power over Ethernet system of claim 1, wherein said electrical measurements are taken by said physical layer device during an echo cancellation process.

4. The power over Ethernet system of claim 1, wherein said electrical measurements includes echo return loss.

5. The power over Ethernet system of claim 1, wherein said electrical measurements includes time domain reflectometry.

6. The power over ethernet system of claim 1, wherein said electrical measurements includes cross talk.

7. The power over Ethernet system of claim 1, wherein said power controller controls an aspect of operation of said power sourcing equipment based on said indication of said temperature hot spot.

8. The power over Ethernet system of claim 7, wherein said aspect of operation is a change in current threshold at said power sourcing equipment.

9. The power over Ethernet system of claim 7, wherein said aspect of operation is a change in power consumption at said powered device.

10. A cable diagnostic system that identifies a temperature hot spot in a network cable, comprising, comprising:

a physical layer device that measures an electrical characteristic of a network cable that provides an operable data transmission path between a first device and a second device;

a controller that determines whether an analysis of said measured electrical characteristic indicates an existence of a temperature signature, said controller also being configured to generate a report based on said determination, said report including a location along said network cable at which a temperature hot spot is suspected.

11. The cable diagnostic system of claim 10, wherein said physical layer device measures said electrical characteristic during an echo cancellation process.

12. The cable diagnostic system of claim 10, wherein said controller is part of a power over Ethernet system.

13. The cable diagnostic system of claim 10, wherein said electrical characteristic is one of echo return loss or cross talk of said network cable.

14. The cable diagnostic system of claim 10, wherein said physical layer device is associated with a power sourcing equipment.

15. The cable diagnostic system of claim 10, wherein said physical layer device is associated with a powered device.

* * * * *